(12) United States Patent
Zacho

(10) Patent No.: US 6,367,469 B1
(45) Date of Patent: Apr. 9, 2002

(54) JET BLASTER DEVICE

(76) Inventor: Bo Ravnsbæk Zacho, Østermarksvej 12, Bjedstrup, DK-8660 Skanderborg (DK)

( * ) Notice: Subject to any disclaimer, the term of this patent is extended or adjusted under 35 U.S.C. 154(b) by 0 days.

(21) Appl. No.: 09/533,698

(22) Filed: Mar. 23, 2000

(51) Int. Cl.[7] .............................................. F23C 5/00
(52) U.S. Cl. ...................... 126/271.2 R; 126/271.2 A; 431/344
(58) Field of Search ................... 126/271.1 R, 271.2 A, 126/271.2 R, 271.2 C, 343.5; 431/344, 345; 432/224, 225

(56) References Cited

U.S. PATENT DOCUMENTS

| | | | | |
|---|---|---|---|---|
| 1,925,164 A | * | 9/1933 | Woolery | 126/271.2 A |
| 2,610,622 A | * | 9/1952 | Coggin | 126/271.2 C |
| 2,839,047 A | * | 6/1958 | Davusson et al. | 126/271.2 C |
| 2,864,360 A | * | 12/1958 | Love | 126/271.2 R |
| 3,063,442 A | * | 11/1962 | Brown | 126/271.2 A |
| 3,108,586 A | * | 10/1963 | Wilson | 126/271.2 A |
| 3,173,413 A | * | 3/1965 | Denton | 126/271.2 R |
| 3,451,470 A | * | 6/1969 | Herrick | 126/271.2 A |
| 4,860,727 A | * | 8/1989 | Eads | 126/271.2 R |

FOREIGN PATENT DOCUMENTS

| | | | | |
|---|---|---|---|---|
| FR | 749374 | * | 7/1933 | 126/271.2 C |
| GB | 425631 | * | 3/1935 | 126/271.2 A |

* cited by examiner

Primary Examiner—James C. Yeung
(74) Attorney, Agent, or Firm—Antonelli, Terry, Stout & Kraus, LLP

(57) ABSTRACT

A jet-blaster device especially for use by the application of preformed road markings and pavement maintenance works such as crack filling and other industrial applications such as epoxy injections for concrete slabs, said jet-blaster device comprising a wheel supported frame system provided with a supply gas bottle, a combustion engine being drivingly connected with a fan, an outlet opening of which being connected by means of a flexible hose to a jet-blaster gun comprising a gas heated burner system having an outlet nozzle. Hereby is obtained an improved mobile jet-blaster device which especially is well qualified for the application of preformed road markings and pavement maintenance works such as crack filling and other industrial applications such as epoxy injections for concrete slabs.

7 Claims, 4 Drawing Sheets

JET BLASTER DEVICE

BACKGROUND OF THE INVENTION

1. Field of the Invention

The present invention relates to a heating device producing a jet of hot gas especially for use for the application of preformed road markings and pavement maintenance work such as crack filling and other industrial applications such as epoxy injections for concrete slabs.

2. Description of the Prior Art

In order to provide different traffic markings on the surfaces of road pavements in an easier manner it is known to make use of prefabricated stripes and other signs made from thermoplastic or epoxy which for instance are marketed by the company Linear Dynamics Inc. under the trademark ThermaLine™.

ThermaLine™ is a heat fused performed thermoplastic pavement marking item specifically designed for easy, year round application with the durability of hot applied thermoplastic and the excellent appearance of preformed plastic.

Furthermore ThermaLine™ comes with a unique glassing system which will ensure the desired night time reflectivity and needed skid resistance for today's driving public. It is easy to apply and can be installed during all four seasons of the year.

SUMMARY OF THE INVENTION

According to the invention there is provided a heating device and a method of use producing a jet of hot gas especially for use in the application of preformed road markings and pavement maintenance work such as crack filling and other industrial applications such as epoxy injections for concrete slabs, said heating device comprising a wheel supported frame system provided with a supply gas bottle, a combustion engine which drives a fan, an outlet opening connected by means of a flexible hose to a heat gun comprising a gas heated burner system having an outlet nozzle. The invention provides an improved mobile heating device which especially is well qualified for the application of preformed road markings and pavement maintenance works such as crack filling and other industrial applications such as epoxy injections for concrete slabs.

According to another aspect of the invention the heating device is provided in a form of a pushcart with a steering pole at one end and the heat gun at the opposite end. The heating device is as a compact mobile unit which is very easy to operate and requires very little free space.

According to a further aspect of the invention the heating device is provided with the heat gun mounted in an inclined and sidewardly adjustable orientation in such a manner that the outlet nozzle of the heat gun may be directed against surface paths at both sides and at the front end thereof.

According to a still further aspect of the invention the heating device may be provided with the outlet from the heat gun provided with a transverse directed mouthpiece which by way of example has a width of same magnitude as that of the heating device.

According to a still further aspect of the invention, the mouthpiece may furthermore be rotated in relation to the outlet nozzle of the heat gun so that the active working path of the heating device may easily be adjusted in accordance with the width of the preformed marking item being applied.

According to a still further aspect of the invention, the heating device may be self-propelled by an electric drive motor supplied with electric power from a generator which either is driven by the combustion engine or is a part thereof.

According to a still further aspect of the invention, the heating device may be self-propelled with the combustion engine driving wheels and a number of fans and a corresponding number of associated heat guns, the outlet nozzles of which ending in a common oblong heating box positioned close to the pavement surface.

DETAILED DESCRIPTION OF THE PREFERRED EMBODIMENTS

Figure 1:
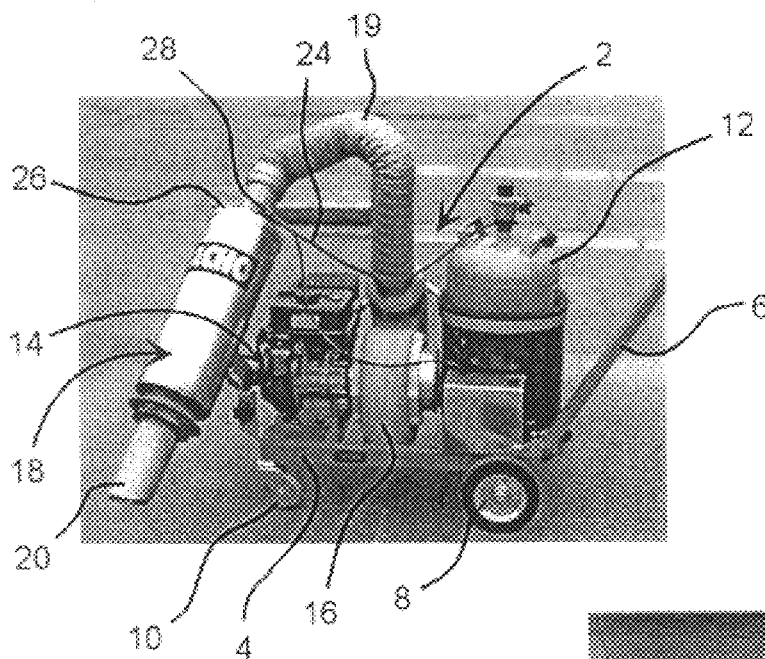
FIG. 1 shows a side view of an embodiment of a heating device according to the invention.
Figure 2:
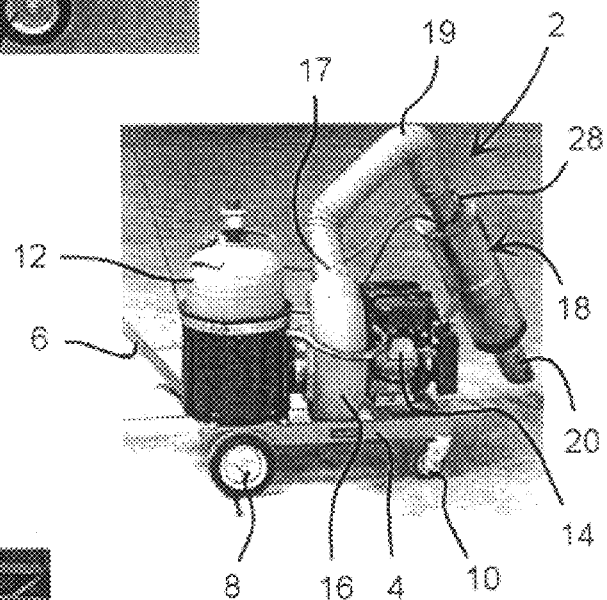
FIG. 2 shows a side view of the heating device shown in FIG. 1—as seen from the opposite side.
Figure 3:
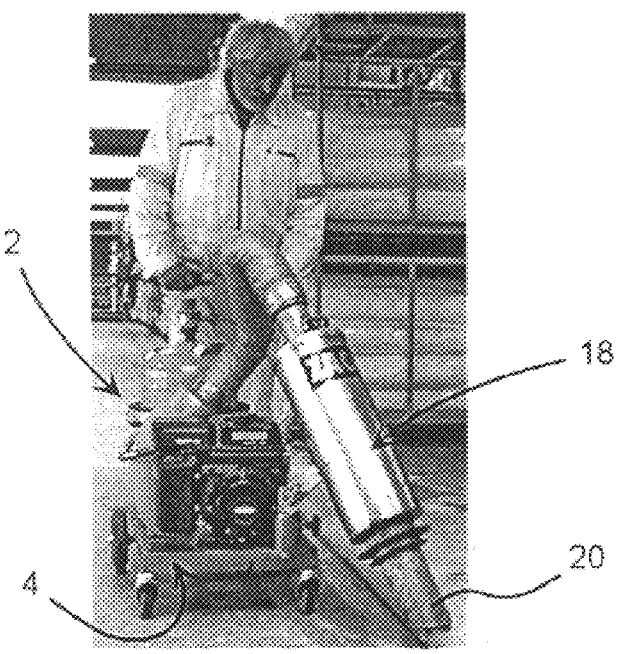
FIG. 3 shows the heating device shown in FIGS. 1 and 2 during crack filling maintenance work of a floor construction.
Figure 8:
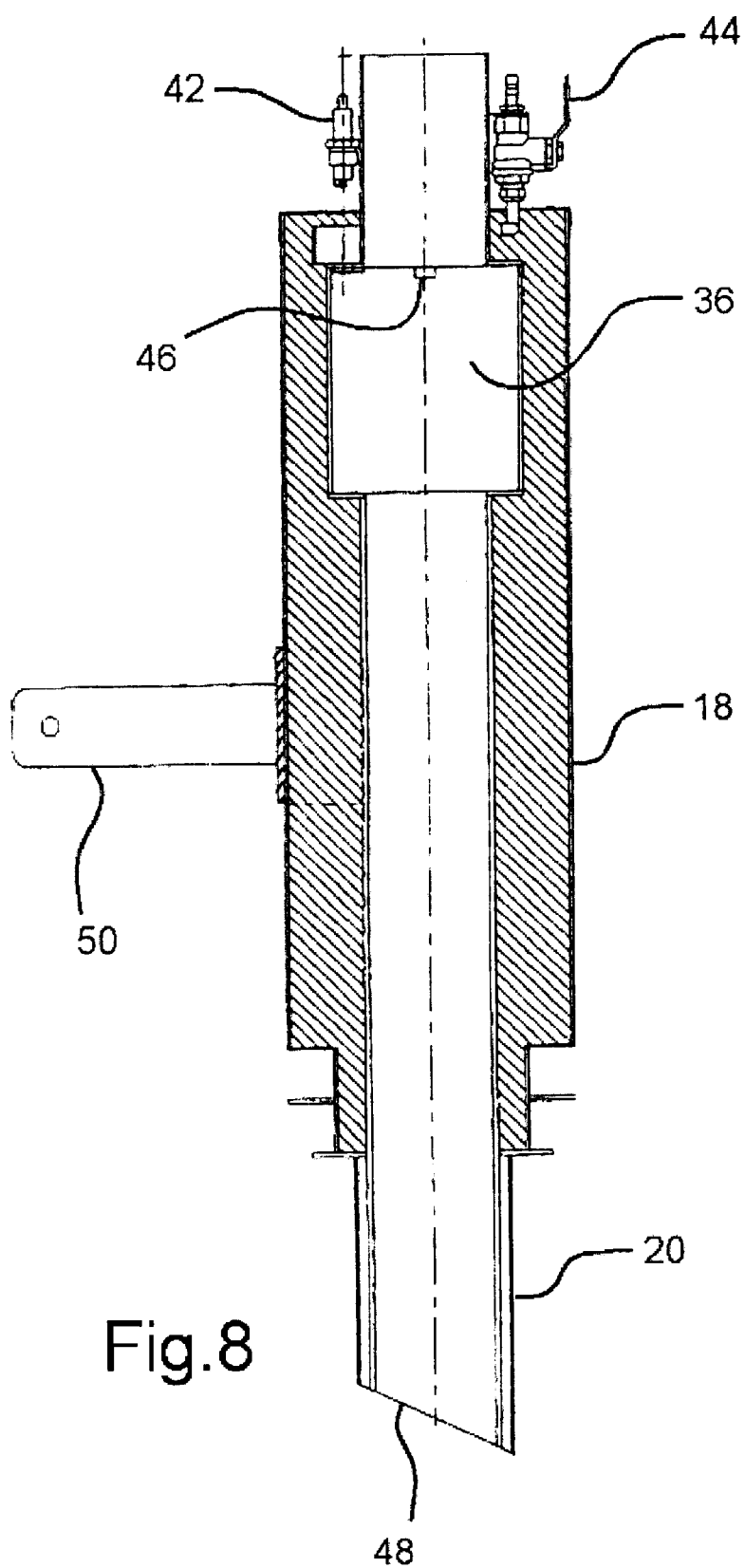
FIG. 8 shows a cross sectional view of a preferred embodiment of a gas heated burner system of the heating device according to the invention.

The heating device 2 shown in FIGS. 1–3 is constructed on a pushcart 4 with a cart pole 6 and stationary wheels 8 at one end and pivotable mounted wheels 10 at the opposite end. On top of the stationary wheels 8, the pushcart 4 has a compartment for a supply gas bottle 12. At the opposite end of the pushcart 4 is mounted a combustion engine 14 which drives a fan 16, the exhaust opening 17 of which is connected by means of a flexible hose 19 to the top end of a heat gun 18 which provides a jet of hot combustion gases to heat the pavement surface, the outlet nozzle 20 of which is positioned close to a pavement surface 22. Gas from the gas bottle 12 is supplied through a hose 24 to a burner system 26 at the top end of the heat gun 18 (FIG. 8).

The heat gun 18 is mounted inclined in relation to the front end of the pushcart 4 on a pivot socket 28 so that the outlet nozzle 20 of the heat gun 18 may easily be adjusted to assume any position at both sides of the pushcart 4 and at the front end thereof in order to make it possible to direct the outlet nozzle 20 of the heat gun 18 towards any possible pavement surface path during forward or rearward movement of the pushcart 4—as for instance shown in FIG. 3, where the heating device 2 is used in connection with crack filling.

Figure 4:
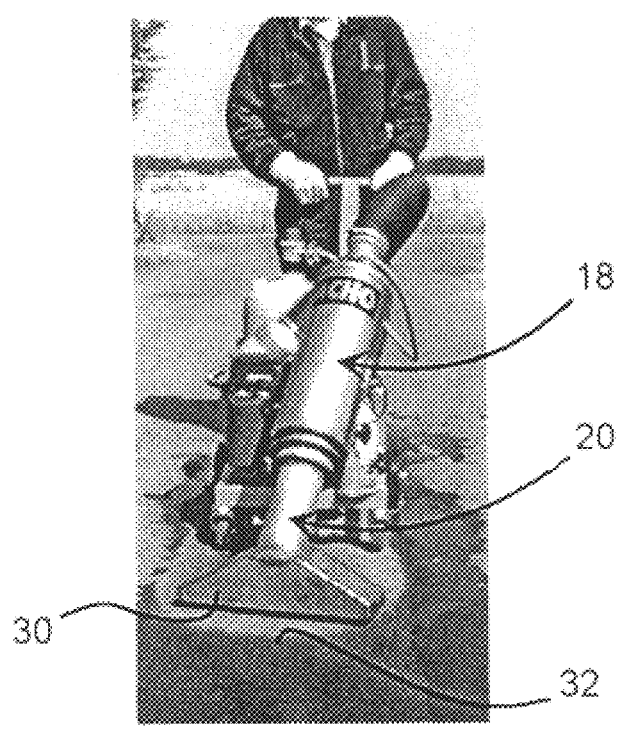
FIG. 4 shows another embodiment of a heating device according to the invention provided with a transverse mouthpiece during drying work of an asphalt pavement surface.
Figure 5:
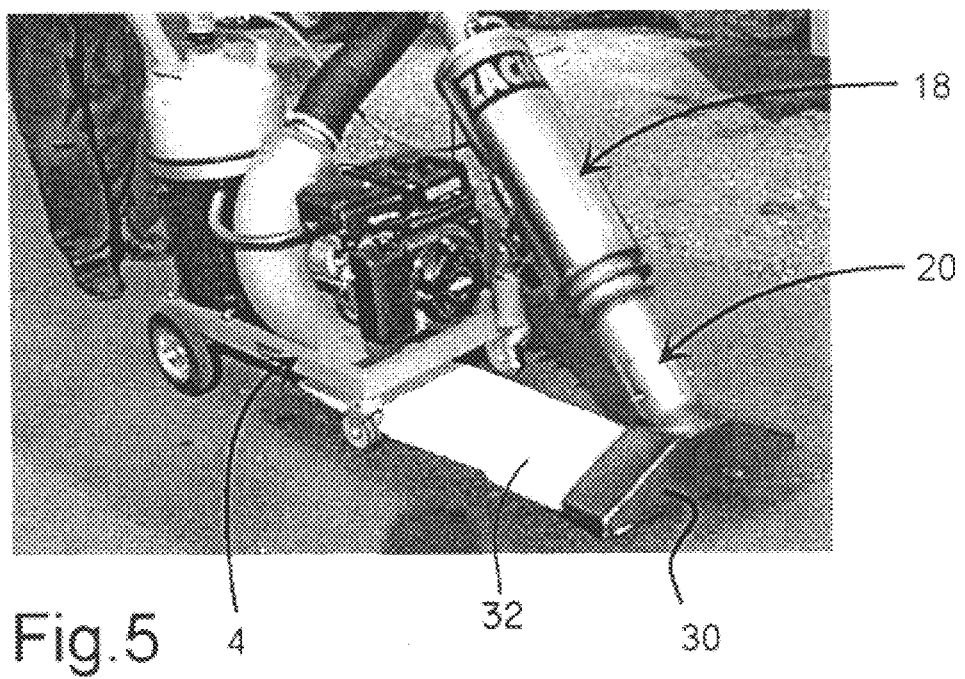
FIG. 5 shows the heating device shown in FIG. 4 during heat application of a preformed marking stripe on an asphalt pavement surface.

The heating device 2 shown in FIG. 4 has the outlet nozzle 20 of the heat gun 18 provided with a transverse mouthpiece 30 having a width of the same magnitude as that of the width of the pushcart 4. The mouthpiece 30 is furthermore pivotally connected to the outlet nozzle 20 of the heat gun 18 so that the active width of the mouthpiece 30 may be adjusted by turning it in relation to the outlet nozzle 20. In FIG. 4, the heating device 2 is used for drying a surface 32 of an asphalt pavement surface—for instance prior to applying a preformed marking item to the asphalt pavement surface 32—as shown in FIG. 5.

It should be mentioned that the heating device 2 shown in FIGS. 1–5 very easily may be made self-propelled by adding a driving motor which for instance may be an electric driving motor supplied with electric power from a generator driven by the combustion engine 14.

Figure 6:
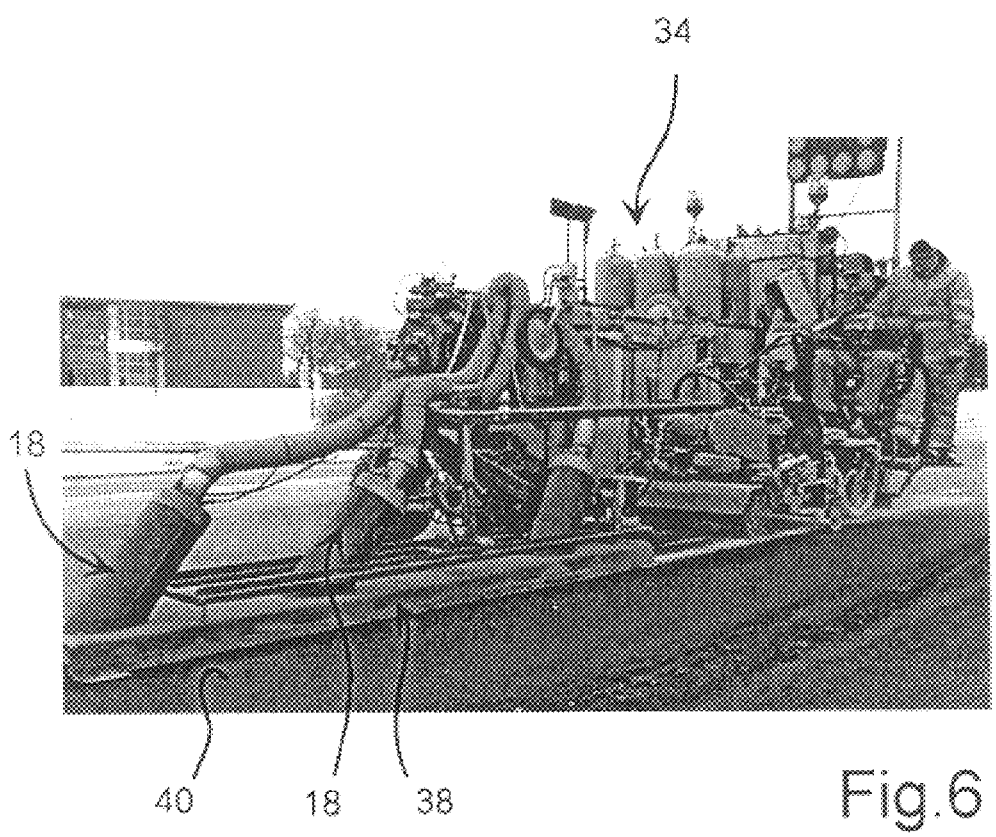
FIG. 6 shows a further embodiment of a larger self-propelling heating device according to the invention.
Figure 7:
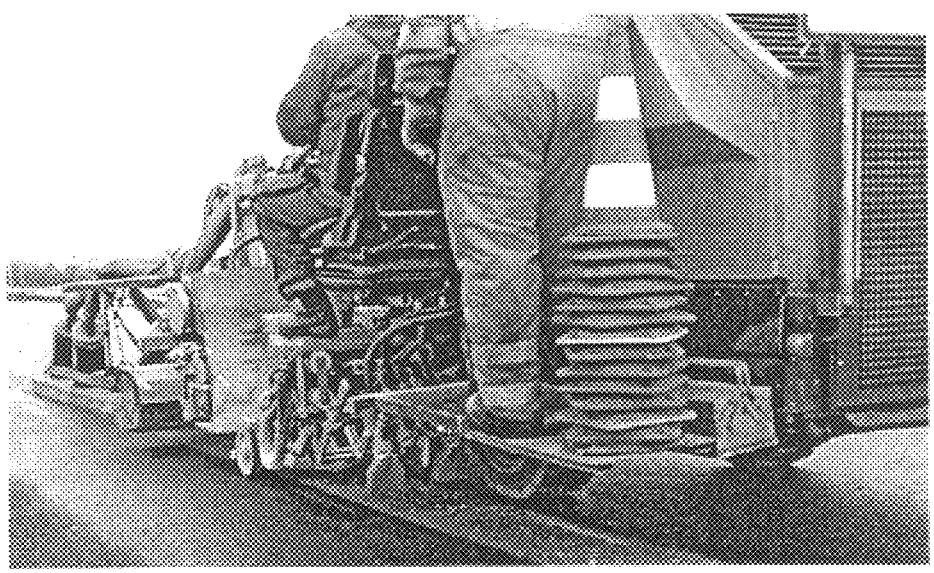
FIG. 7 shows the heating device shown in FIG. 6 as seen from behind.

A larger self-propelled jet-blaster device 34 shown in FIGS. 6 and 7 is provided with three heat guns 18 each producing a jet of hot combustion gases for heating a section of the asphalt pavement surface 40 and connected to a common heating box 38 positioned close to the asphalt pavement surface during application of preformed marking items to the surface of the asphalt pavement surface.

FIG. 8 shows a cross sectional view of the heat gun 18 which produces a jet of hot combustion gases for treating a road surface which at the top end is connected with the flexible hose 19 from the fan 16. The heat gun 18 has a burner combustion chamber 36 where a spark plug 42 (shown in the left hand side) is screwed in and where the gas hose 24 from the supply gas bottle 12 is connected to a ball valve 44 so that gas may be supplied to the burner combustion chamber 36 through inlets 46 at both sides thereof. At the opposite end, the heat gun 18 has an outlet nozzle 20 with an inclined cut end part 48. An outer shell of the heat gun 18 has a projecting support lever 50 near the middle by means of which the heat gun 18 is mounted at the front end of the pushcart 4. The heat gun 18 between the outer shell and the inner shell is provided with a high temperature insulation material (Kerlane) in view of the outlet temperature of the hot combustion gas stream from the outlet nozzle reaching about 1200° C.

What I claim is:

1. A process for heat treating pavement with a heating device including a wheel supported frame which supports at least one fluid supply bottle two sides and a front, each fluid supply bottle providing combustible fluid to be combusted to produce a jet of hot combustion gases for heating the pavement to a temperature sufficient to adhere material to the pavement, at least one combustion engine, at least one fan, each fan being driven by an associated combustion engine and producing a stream of air, at least one combustion chamber, each combustion chamber being coupled to the stream of air from one of the at least one fan and receiving the combustible fluid provided from one of the at least one fluid supply bottle with the combustible fluid and the stream of air being combusted to produce the jet of the hot combustion gases and at least one hot combustion gas outlet outputting the hot combustion gases, the process comprising:

initiating combustion within at least one combustion chamber by igniting the combustible fluid and the stream of air, each combustion chamber producing the jet of the hot combustion gases with the jet of hot combustion gas having a maximum temperature of about 1200° C.;

directing the jet of hot combustion gases from at least one hot combustion gas outlet toward the pavement to heat the pavement and the material contacting the pavement to a temperature sufficient to adhere the material contacting the pavement to the pavement;

at least one hot combustion gas outlet in proximity to one of the sides or the front to direct hot combustion gases toward a side of the two sides or the front;

positioning a mouthpiece attached to the at least one hot gas combustion outlet toward the pavement during motion; and heating a section of pavement by discharging the hot combustion gases downward from the mouthpiece toward the pavement from one of the two sides or the front.

2. A process in accordance with claim 1 wherein:

the material is a prefabricated marker.

3. A process in accordance with claim 1 wherein:

the material is a crack filling material.

4. A process in accordance with claim 1 wherein:

the material is an epoxy injection and the pavement is concrete.

5. A process in accordance with claim 1 wherein:

the material is a sign.

6. A process in accordance with claim 1 wherein:

the material is a road marking.

7. A process in accordance with claim 1 wherein:

the device is self-propelled by an engine and includes a plurality of fluid supply bottles, combustion engines and associated fans and hot gas outlets; and the device moves while heating a plurality of sections of pavement.

* * * * *